United States Patent [19]
Foladare et al.

[11] Patent Number: 5,907,547
[45] Date of Patent: May 25, 1999

[54] SYSTEM AND METHOD FOR ESTABLISHING INTERNET COMMUNICATIONS LINKS

[75] Inventors: Mark Jeffrey Foladare, Kendall Park; Shelley B. Goldman, East Brunswick; David Phillip Silverman, Somerville; Robert S. Westrich, Middletown, all of N.J.

[73] Assignee: AT&T Corp, Middletown, N.J.

[21] Appl. No.: 08/736,150

[22] Filed: Oct. 24, 1996

[51] Int. Cl.$^6$ ............................... H04L 12/64
[52] U.S. Cl. ........................... 370/352; 379/309
[58] Field of Search .................... 370/352, 353, 370/354, 355, 356, 400, 401, 384, 493, 260, 261, 389; 379/90.01, 93.01, 93.09, 93.12, 93.14, 93.25, 265, 266, 309, 308, 88.13, 88.17, 201, 209, 258, 260, 261; 348/12

[56] References Cited

U.S. PATENT DOCUMENTS

| | | | |
|---|---|---|---|
| 4,984,155 | 1/1991 | Geier et al. | 379/93.12 |
| 5,504,933 | 4/1996 | Saito | 348/12 |
| 5,583,922 | 12/1996 | Davis et al. | 379/93.09 |
| 5,602,846 | 2/1997 | Holmquist et al. | 370/384 |
| 5,727,048 | 3/1998 | Hiroshima et al. | 379/93.12 |

*Primary Examiner*—Huy D. Vu

[57] ABSTRACT

A technique is provided for establishing data communications links and associated telephone calls between customers and customer service representatives. Customers access the Internet from clients. A merchant provides an on-line catalog using a Web server. When the customer requests that a customer service representative contact the customer, linking information is provided to the client. When one of the customer service representatives is available, the server sends a notification packet to the client to notify the customer and to provide the customer with an opportunity to decide whether or not to continue. If the customer decides to continue, an Internet communications link and telephone call are established between the customer and the customer service representative based on the linking information.

18 Claims, 3 Drawing Sheets

SYSTEM AND METHOD FOR ESTABLISHING INTERNET COMMUNICATIONS LINKS

FIELD OF THE INVENTION

This invention relates to on-line transactions, and particularly, to on-line transactions between a customer and a merchant using packet-based data networks such as the Internet or an intranet.

BACKGROUND OF THE INVENTION

The Internet has made it convenient for merchants to sell products and provide customer service on-line. For example, many merchants have established World Wide Web sites containing on-line catalogs of their products. With a Web browser, customers can access such a Web site to view images of the products and to obtain related product information. If a customer is interested in a product contained in the on-line catalog, the customer can place a telephone call to a customer service representative at the merchant. The customer service representative can provide the customer with product information and can take orders for products. An important aspect of this type of transaction is that the customer can remain on-line, so that the customer service representative can direct the customer to particular portions of the on-line catalog. If the customer service representative is provided with a suitable connection to the merchant's Web server, the customer service representative can actively control which portions of the catalog are displayed on the customer's computer. The customer service representative can use this feature to make a sales presentation to the customer.

Sometimes a customer service representative is not available to accept a telephone call from the customer. As a result, the customer must wait on hold until a representative is available. The Instant Answer™ service available from AT&T alleviates some of the difficulties associated with this situation. Using the Instant Answer™ service, a customer who is browsing an on-line catalog can click on a "call me" button in the on-line catalog when the customer wishes to speak to a customer service representative. Selecting the call me button alerts the merchant that the customer should be called by the next available customer service representative. If no customer service representative is currently available, the merchant's Web server can transmit a message to the customer's computer to let the customer know that all representatives are busy. A message might also be transmitted that indicates in realtime the estimated time remaining before a customer service representative will be available.

While the customer is waiting for a customer service representative from the merchant to call, the customer may wish to continue to browse the Internet. In particular, the customer may wish to access Web sites unrelated to the merchant's on-line catalog. However, when the customer accesses another Web site, the data communications link between the customer's computer and the merchant's server is typically broken. As a result, after the merchant's customer service representative has called the customer, the customer service representative must wait while the customer attempts to reestablish a data communications link between the customer's computer and the merchant's Web site.

It is therefore an object of the present invention to provide a way in which to notify a customer that a customer service representative is available and to facilitate the process of establishing a data communications link with the representative.

SUMMARY OF THE INVENTION

This and other objects of the invention are accomplished in accordance with the principles of the present invention by providing a system in which a customer at a client can access an on-line catalog provided by a merchant on a server. Customer service representatives have terminals connected to the server. The customer and customer service representatives also have telephones.

While the customer is accessing information in the merchant's on-line catalog, the customer may click on a button to request that one of the merchant's customer service representatives contact the customer. When the button is selected, the server downloads a notification applet containing a notification source identifier that identifies the server. The notification applet monitors incoming Internet traffic using the notification source identifier.

When a customer service representative is available the server sends a notification packet to the client, which is recognized by the notification applet. A notification message is then displayed for the customer that provides the customer with an opportunity to decide whether or not to continue with the process of establishing contact with the customer service representative. If the customer answers affirmatively (e.g., by clicking on a "yes" button), a data communications link is established between the client and the terminal of the customer service representative.

The data communications link is established based on linking information provided to the client. If desired, the linking information can be provided in advance, when the notification applet is downloaded. Alternatively, the linking information can be provided dynamically, as part of the notification packet. Preferably, the customer service representative and the customer both run standard Web browsers, which the server bridges together to form the data communications link. A telephone call between the customer and the customer service representative is also set up, in addition to the Internet data communications link.

Because the customer can establish the data communications link between the customer and customer service representative relatively easily, the present invention facilitates the process of setting up the data communications link. In addition, because the customer is aware that a notification message will be displayed on the client when the customer service representative is available, the customer is free to use the client to browse the Internet while awaiting contact from the customer service representative.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
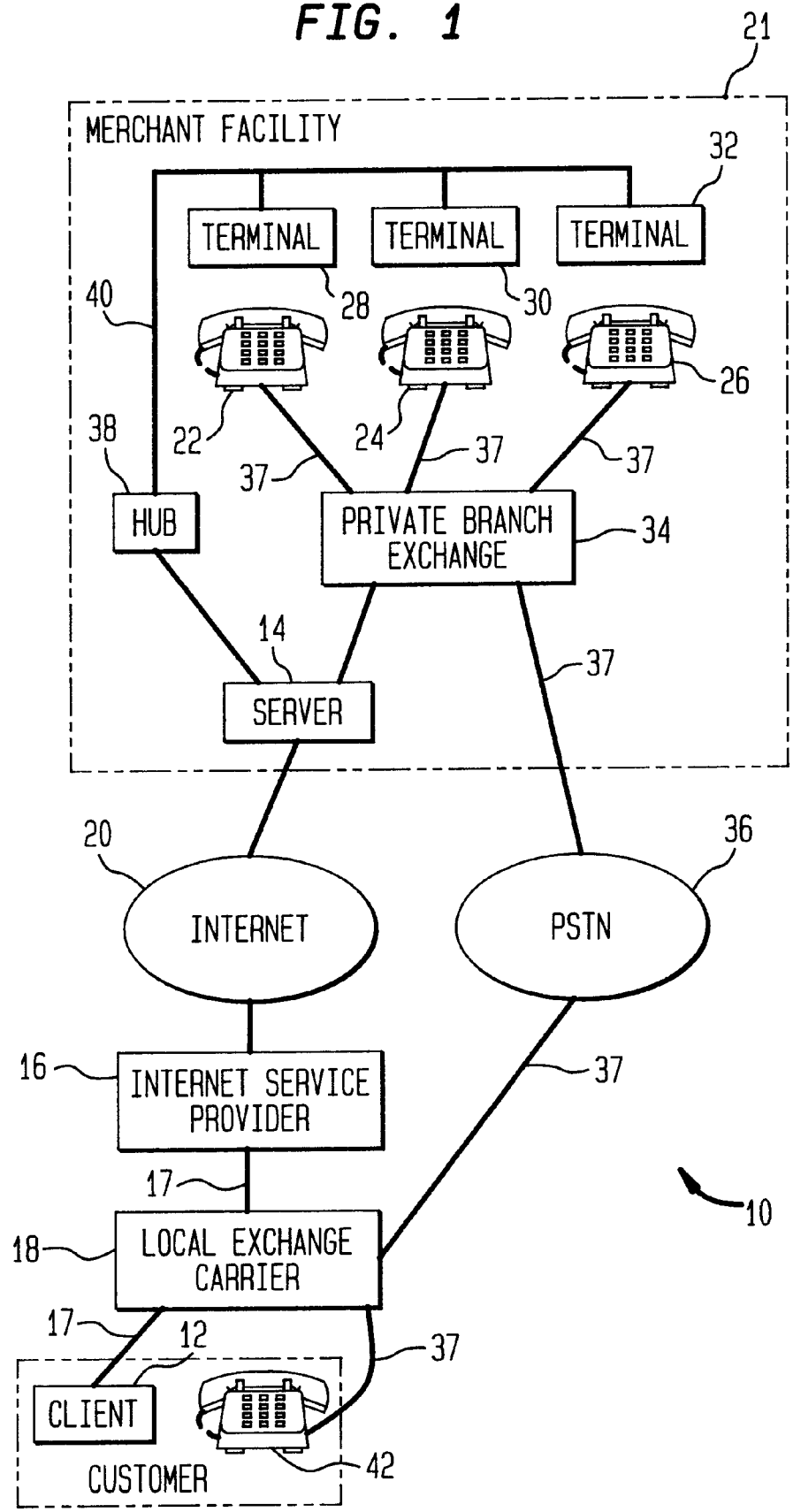
FIG. 1 is a diagram of a communications system in which a customer can access a merchant's Web site in accordance with the principles of the present invention.

In communications system 10, a customer at client 12 can access on-line information provided by a merchant on server 14, as shown in FIG. 1. Merchants typically make on-line catalogs and other product information available over the Internet using the protocols of the World Wide Web. Client 12 is connected to an Internet service provider 16, such as AT&T's Worldnet™ Internet service. For example, client 12 can be connected to Internet service provider 16 via lines 17 and local exchange carrier 18, which is part of the public switched telephone network (PSTN). Internet service provider 16 provides a connection to the Internet 20.

At merchant facility 21, each customer service representative is assigned a telephone 22, 24, or 26 and a terminal 28, 30, or 32. Terminals 28, 30, and 32 are preferably intelligent terminals based on personal computers, but could alternatively be "dumb" terminals. Telephones 22, 24, and 26 are connected to public switched telephone network 36 via private branch exchange 34. Terminals 28, 30, and 32 may be linked by bus 40 and connected to server 14 via hub 38.

When a customer wishes to view on-line catalogs or other information provided by the merchant, the customer establishes an Internet connection using Internet service provider 16. The customer can access material on the Internet by running standard browser software on client 12, such as the Netscape Navigator browser of Netscape Communications corporation. To access material on server 14, the customer establishes a data communications link between client 12 and server 14. Typically, the communications link uses the protocols of the World Wide Web, so that the on-line information provided by server 14 is available in the form of Web pages.

As the customer views information provided on the merchant's server 14, the customer may wish to speak to a customer service representative, either to request product information or to place an order. Telephoning the customer service representatives at merchant facility 20 can result in the customer being placed on hold to wait for the next available customer service representative.

The AT&T Instant Answer™ service allows the customer to click on a "call me" button on a displayed Web page. When the call me button is selected, server 14 arranges for a return telephone call to be made from the next available customer service representative at merchant facility 21. However, before the call from the customer service representative is received, the customer may break the Internet communications link that was established between client 12 and server 14 when the customer was accessing the merchant's on-line catalog. The link may be broken because the customer browses elsewhere on the Internet or because the customer signs off or loses the connection due to noise. As a result, when the telephone call is placed to the customer, the customer is no longer accessing the merchant's Web site on server 14.

In accordance with the present invention, the customer may click on a button on a Web page to request that one of the merchant's customer service representatives contact the customer. When the button is selected, server 14 downloads a notification applet containing a notification source identifier that identifies the source (i.e., server 14) from which a notification packet is to be sent when the customer service representative is available. The notification applet runs in the background on client 12 and continually monitors incoming communications traffic from Internet 20 for notification packets containing the notification source identifier.

When a customer service representative is available to handle the customer's request or will soon be available, server 14 sends a notification packet to client 12. If desired, the process of sending the notification packet can be initiated based on commands from the customer service representative terminal 28, 30, or 32 to server 14 that indicate to server 14 that the representative is available. The addressing information that server 14 requires to properly direct the notification packet to client 12 is stored on server 14 when the customer requests that the customer service representative contact the customer (e.g., by clicking on a suitable button on a Web page in the merchant's on-line catalog).

When client 12 receives the notification packet, a notification message is displayed for the customer at client 12. For example, the message "customer service representative is now available—would you like to continue?" could be displayed. If the customer answers affirmatively (e.g., by clicking on a "yes" button), a data communications link is established between client 12 and server 14. The data communications link is established based on linking information provided to client 12. If desired, the linking information can be provided in advance, when the notification applet is downloaded. Alternatively, the linking information can be provided dynamically, as part of the notification packet. Preferably, the customer service representative and the customer both run standard Web browsers, which server 14 bridges together to form the data communications link. A telephone call between the customer and the customer service representative is also set up, in addition to the data communications link. For example, server 14 can direct private branch exchange 34 to set up a telephone call between the customer service representative and the customer via public switched telephone network 36 and local exchange carrier 18. The telephone call is established over lines 37.

Server 14 accepts commands from the terminal 28, 30, or 32 used by the customer service representative that allow the representative to control the content of the Web pages displayed to the customer on client 12. This process, which is referred to as "pushing down" Web pages from server 14 to client 12, allows the customer service representative to make a sales presentation or to focus the customer's attention on a particular item in an on-line catalog.

If the customer does not respond to the notification message or responds negatively (e.g., by clicking on a "no" button), server 14 preferably does not continue to process the customer's request. For example, failure to respond affirmatively to the notification message within a predetermined time period (e.g., one minute) results in permanent cancellation of the customer's request. If desired, however, the customer can be given further opportunities to respond.

Because the customer can establish the data communications link between the customer and customer service representative relatively easily (e.g., by clicking on the yes button in response to the notification message), the present arrangement facilitates the process of setting up the data communications link. When the customer clicks on the yes button, the customer service representative is given a clear indication that the customer is at client 12 and is ready to proceed. In addition, because the customer is aware that a notification message will be displayed on client 12 when the customer service representative is ready, the customer is free to break the data communications link between client 12 and server 14 after the customer submits the initial request to be contacted by the representative. The browsing window that was used to access the merchant's site can be minimized manually or automatically and a new browsing window can be opened to access unrelated material. When the notification message is displayed, it may be overlaid on top of existing material, thereby notifying the customer that it is time to complete the transaction with the merchant.

Figure 2:
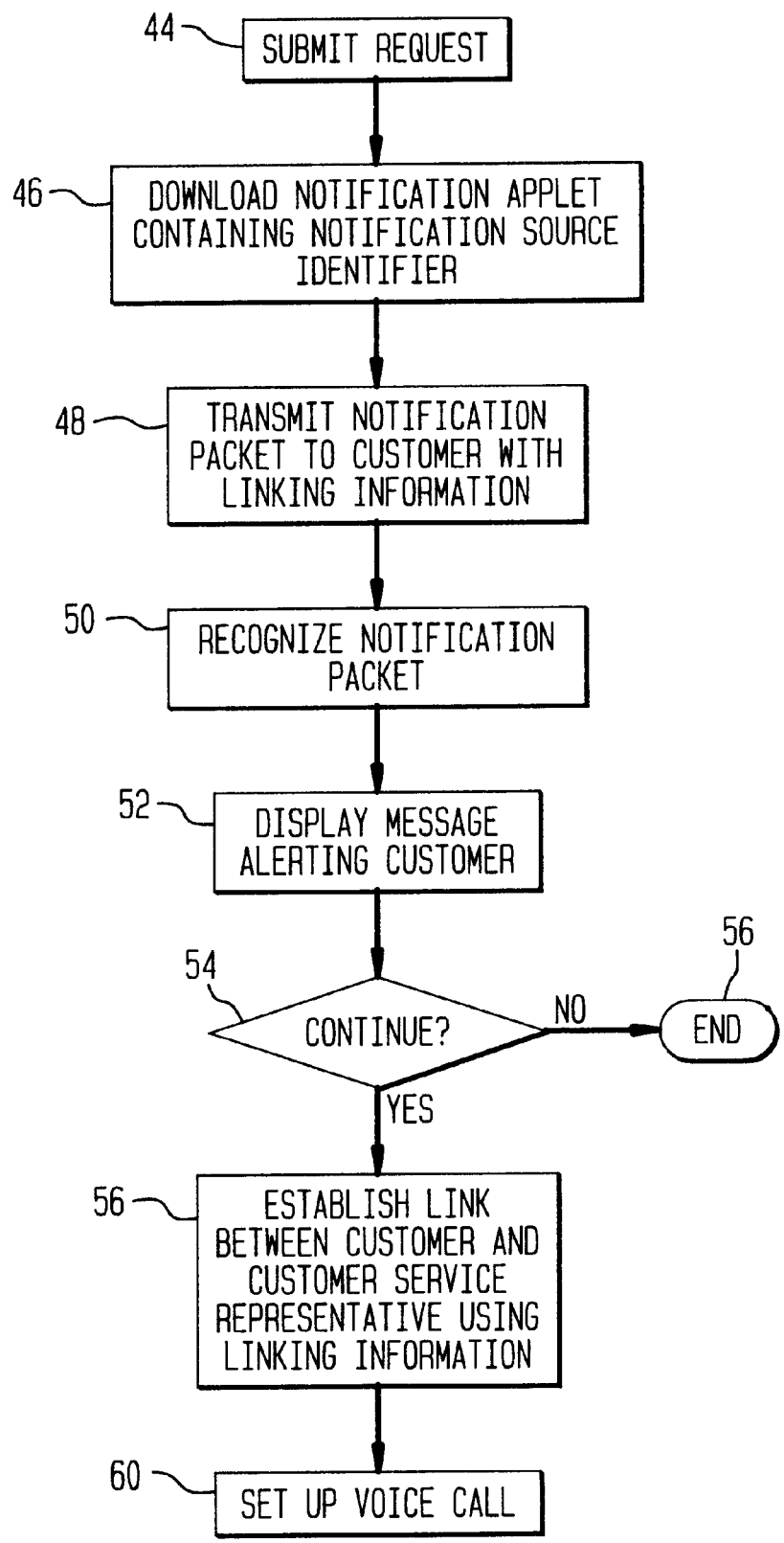
FIGS. 2 and 3 are flow chart diagrams of steps involved in establishing data and telephone communications links between a customer and a customer service representative in accordance with the present invention.
Figure 3:
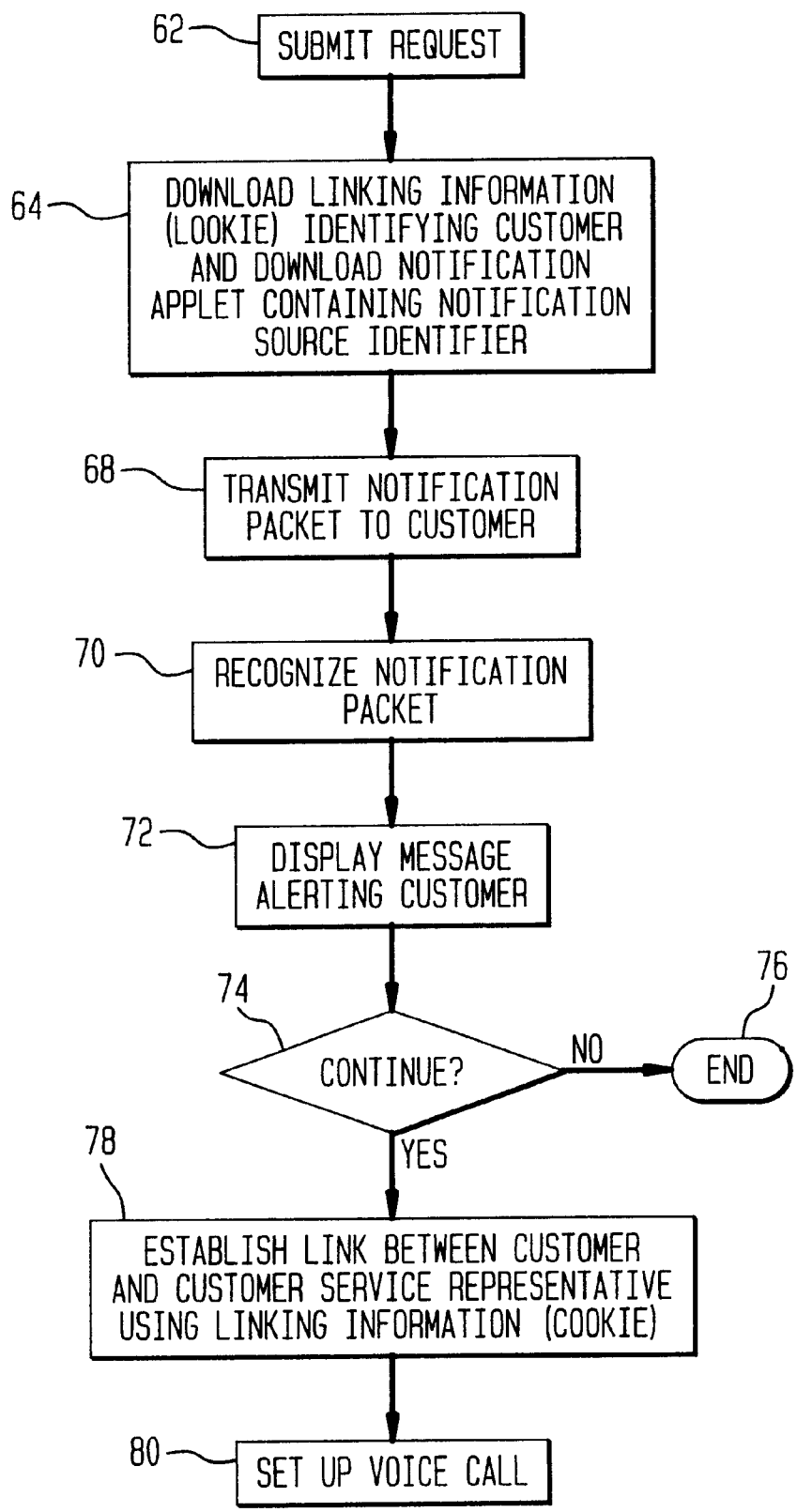

Various implementations of system 10 are possible. FIGS. 2 and 3 show steps involved in notifying a customer that a customer service representative is available to handle the customer's transaction. In the process of FIG. 2, the linking information used to establish the data communications link between the customer and the customer service representative is provided dynamically, as part of the notification packet. In the process of FIG. 3, the linking information is provided ahead of time, when downloading the notification applet.

As shown in FIG. 2, at step 44, after a customer views information in an on-line catalog on the merchant's Web site, the customer can submit a request that a telephone call be set up between the customer and a customer service representative and that an associated data communications link be established. The request can be made by clicking on a button provided as part of the Web pages that make up the on-line catalog. The customer typically provides the telephone number for telephone 42 during or prior to step 44.

In response to the request submitted at step 44, server 14 downloads a notification applet (e.g., a Java applet) to client 12 over the data communications link between client 12 and server 14 at step 46. The data communications link over which the notification applet is downloaded is preferably the same link used by the customer when accessing the merchant's Web site on server 14. The notification applet contains a notification source identifier that specifies how the notification applet should monitor incoming Internet traffic to determine when server 14 is trying to contact client 12. For example, the notification source identifier may contain one or more ports or Internet Protocol (IP) addresses to monitor. Preferably, the notification source identifier specifies a particular port (e.g., port 80) and a unique IP address associated with server 14.

After the notification applet is downloaded from server 14, it runs continuously in the background on client 12. While the notification applet is running on client 12, the customer is free to break the data communications link between client 12 and server 14 and to browse elsewhere on the Internet. The customer does not need to maintain a continuous data communications link between client 12 and server 14, because a suitable data communications link can be readily established once the customer service representative is available.

At step 48, server 14 transmits a notification packet to client 12 via Internet 20 indicating that a customer service representative is available or will soon be available to help the customer. Customer service representatives can alert server 14 that they are available by entering suitable commands at their terminals 28, 30, and 32. The notification packet contains linking information that identifies the particular customer service representative with whom the customer is to interact. For example, the notification packet may contain a universal resource locator (URL) that specifies the merchant's Web site address on server 14 and an associated parameter identifying the particular customer service representative. In addition, the notification packet preferably contains information in its data field that identifies it as a notification packet. Because the notification packet originates at server 14, the port and source IP address of the notification packet will match the notification source identifier information provided at step 46.

The notification applet can identify the notification packet by comparing incoming packets of Internet traffic to the notification source identifier and by confirming that the content of the data field of a given packet indicates the packet is a notification packet. The notification applet recognizes the notification packet from server 14 at step 50.

A message informing the customer that the customer service representative is available and asking the customer whether or not the customer would like to continue is overlaid on the display of client 12 at step 52. Because the message is overlaid on the display, the customer is alerted even if the customer is browsing on the Internet or performing another task on client 12 at the time the notification packet is received.

At step 54, the customer decides whether to continue with the transaction (e.g., by clicking on a yes button or a no button). If the customer no longer wishes to receive information or place an order with the merchant, the transaction may be terminated at step 56. If the customer wishes to continue, a data communications link between the customer and the appropriate customer service representative is established at step 58 based on the linking information provided in the notification packet. For example, client 12 can use the linking information to contact server 14 and server 14 can use the linking information containing the parameter identifying the customer service representative to bridge the customer's browser at client 12 and the customer service representative's browser at terminal 28, 30, or 32. Bridging the browsers of the customer and the customer service representative provides a data communications link between the customer and the representative that can be used, for example, to allow the representative to show certain information to the customer by pushing down Web pages from server 14 to client 12.

At step 60, server 14 uses the parameter identifying the representative and the customer's previously provided telephone number to direct private branch exchange 34 to set up a telephone call between the customer service representative (e.g., at one of telephones 22, 24, or 26) and the customer at telephone 42. The customer can view Web pages of information pushed down from server 14 by the customer service representative while the customer and the customer service representative discuss merchandise over the telephone.

FIG. 3 shows steps involved in notifying a customer that a customer service representative is available to handle the customer's transaction, where the linking information used to establish the data communications link is provided ahead of time, when downloading the notification applet. At step 62, after a customer views information in an on-line catalog on the merchant's Web site, the customer can submit a request that a telephone call be set up between the customer and a customer service representative and that an associated data communications link be established. The request can be made by clicking on a button provided as part of the Web pages that make up the online catalog. The customer typically provides the telephone number for telephone 42 during or prior to step 62.

In response to the request submitted at step 62, server 14 downloads linking information identifying the customer and a notification applet (e.g., a Java applet) to client 12 over the data communications link between client 12 and server 14 at step 64. The data communications link used for downloading is preferably the same link used by the customer when accessing the merchant's Web site on server 14. The notification applet contains a notification source identifier that specifies how the notification applet should monitor incoming Internet traffic to determine when server 14 is trying to contact client 12. For example, the notification source identifier may contain one or more ports or Internet Protocol (IP) addresses to monitor. Preferably, the notification source identifier specifies a particular port and a unique IP address associated with server 14.

The linking information is preferably provided in the form of a parameter known as a cookie in the hypertext transfer protocol (http) header of the information downloaded at step 64. The cookie identifies client 12. The cookie is retained in memory by client 12 for future use in establishing the data communications link between the customer and the customer service representative.

After the notification applet is downloaded from server 14, it runs continuously in the background on client 12. While the notification applet is running on client 12, the customer is free to break the data communications link between client 12 and server 14 and to browse elsewhere on the Internet. The customer does not need to maintain a continuous data communications link between client 12 and server 14, because a suitable data communications link can be readily established once the customer service representative is available.

At step 68, server 14 transmits a notification packet to client 12 via Internet 20 indicating that a customer service representative is available or will soon be available to help the customer. Customer service representatives can alert server 14 that they are available by entering suitable commands at their terminals 28, 30, and 32. The notification packet preferably contains information in its data field that identifies it as a notification packet. Because the notification packet originates at server 14, the port and source IP address of the notification packet will match the notification source identifier information provided at step 64.

The notification applet can identify the notification packet by comparing incoming packets of Internet traffic to the notification source identifier and by confirming that the content of the data field of a given packet indicates the packet is a notification packet. The notification applet recognizes the notification packet from server 14 at step 70.

A message informing the customer that the customer service representative is available and asking the customer whether or not the customer would like to continue is overlaid on the display of client 12 at step 72. Because the message is overlaid on the display, the customer is alerted even if the customer is browsing on the Internet or performing another task on client 12 at the time the notification packet is received.

At step 74, the customer decides whether to continue with the transaction (e.g., by clicking on a yes button or a no button). If the customer no longer wishes to receive information or place an order with the merchant, the transaction may be terminated at step 76. If the customer wishes to continue, a data communications link between the customer and the appropriate customer service representative is established at step 78 based on the linking information provided during the downloading step 64. Preferably, client 12 transmits the cookie that was downloaded at step 64 to server 14 in the http header of a packet transmitted to server 14 to establish the link. Server 14 preferably uses the cookie and information regarding which customer service representative is available to bridge the customer's browser at client 12 and the customer service representative's browser at terminal 28, 30, or 32. Server 14 may obtain information identifying an available customer service representative when a customer service representative enters commands indicating to server 14 that the representative is available using one of terminals 28, 30, or 32. Bridging the browsers of the customer and the customer service representative provides a data communications link between the customer and the representative that can be used, for example, to allow the representative to show certain information to the customer by pushing down Web pages from server 14 to client 12.

At step 80, server 14 uses the information identifying the representative and the customer's previously provided telephone number to direct private branch exchange 34 to set up a telephone call between the customer service representative (e.g., at one of telephones 22, 24, or 26) and the customer at telephone 42. The customer can view Web pages of information pushed down from server 14 by the customer service representative while the customer and the customer service representative discuss merchandise over the telephone.

Merchant facility 21 uses server 14 for supporting the on-line catalog, the transmission of the notification applet and notification packet, and the sales presentation function. Server 14 is preferably a single computer or a cluster of interconnected computers. If desired, however, server 14 could be provided by multiple geographically remote computers. For example, two computers could be used, a first to support the on-line catalog, and a second to handle all other aspects of the transaction. If desired, three computers could be used, a first to handle the on-line catalog, a second to handle transmission of the notification applet and packet, and a third to handle sales presentations.

Telephone calls between the customer service representative and the customer are preferably provided over public switched telephone network 36, but may be provided using an Internet telephone arrangement, if desired.

The data network over which the data communications link is established may be any packet-based network, such as an intranet or the Internet.

If desired, the system may be used to establish communications links and telephone calls between parties other than merchants and customers. The on-line information provided on the server may relate to various services.

The foregoing is merely illustrative of the principles of this invention and various modifications can be made by those skilled in the art without departing from the scope and spirit of the invention.

what is claimed is:

1. A system for use in a data communications network in which a party at a client is interconnected with a server via a packet-based communications network, wherein the server provides on-line information, representatives are connected to the server by terminals, and the party and representatives have telephones, the system comprising:

means for receiving a request with the server that a data communications link and a telephone call be established between the party and a given one of the representatives;

means for providing linking information concerning the data communications link;

means for transmitting a notification packet to the client, the notification packet providing the party with an opportunity to select whether to continue with establishing the data communications link and the telephone call, said transmitting means including means for transmitting a predetermined port and Internet Protocol address associated with the server to the client; and means, when the party selects to continue, both for establishing the data communications link between the client and the terminal of the given representative based on the linking information, and for establishing the telephone call between the telephone of the party and the telephone of the given representative.

2. The system defined in claim 1 wherein the on-line information is a merchant's on-line catalog, the means for receiving the request further comprising means for providing a request button on a Web page within the on-line catalog.

3. The system defined in claim 1 wherein the means for providing the linking information comprises means for providing the linking information in advance of the transmission of the notification packet.

4. The system defined in claim 3 wherein the means for providing the linking information comprises means for providing a cookie identifying the client.

5. The system defined in claim 1 wherein the means for providing the linking information comprises means for providing the linking information when transmitting the notification packet.

6. The system defined in claim 5 wherein the means for providing the linking information comprises means for providing universal resource locator information associated with the given representative.

7. The system defined in claim 1 further comprising means for recognizing when the notification packet is received by the client by comparing incoming traffic to the predetermined port and Internet Protocol address.

8. The system defined in claim 1 wherein the client and the terminals run Web browsers, the means for establishing the data communications link and the telephone call further comprising means for bridging the browser on the client and the browser on the terminal of the given representative.

9. The system defined in claim 1 further comprising means for providing a notification message on the client, the notification message allowing the party to select whether to continue with establishing the data communications link and the telephone call.

10. A method for use with a communications network in which a party at a client is interconnected with a server via a packet-based data communications network, wherein the server provides on-line information, representatives are connected to the server by terminals, and the party and representatives have telephones, the method comprising the steps of:

receiving a request with the server that a data communications link and a telephone call be established between the party and a given one of the representatives;

providing linking information concerning the data communications link;

transmitting a notification packet to the client, the notification packet providing the party with an opportunity to select whether to continue with establishing the data communications link and the telephone call, the notification packet further providing a predetermined port and Internet Protocol address associated with the server to the client; and when the party selects to continue, both establishing the data communications link between the client and the terminal of the given representative based on the linking information, and establishing the telephone call between the telephone of the party and the telephone of the given representative.

11. The method defined in claim 10 wherein the on-line information is an on-line catalog, the step of receiving the request further comprising the step of providing a request button on a Web page within the on-line catalog.

12. The method defined in claim 10 wherein the step of providing the linking information comprises the step of providing the linking information in advance of the transmission of the notification packet.

13. The method defined in claim 12 wherein the step of providing the linking information comprises the step of providing a cookie identifying the client.

14. The method defined in claim 10 wherein the step of providing the linking information comprises the step of providing the linking information when transmitting the notification packet.

15. The method defined in claim 14 wherein the step of providing the linking information comprises the step of providing universal resource locator information associated with the given representative.

16. The method defined in claim 10 further comprising the step of recognizing when the notification packet is received by the client by comparing incoming traffic to the predetermined port and Internet Protocol address.

17. The method defined in claim 10 wherein the client and the terminals run Web browsers, the step of establishing the data communications link and the telephone call further comprising the step of bridging the browser on the client and the browser on the terminal of the given representative.

18. The method defined in claim 11 further comprising the step of providing a notification message on the client, the notification message allowing the party to select whether to continue with establishing the data communications link and the telephone call.

* * * * *